(12) United States Patent
Sakurai et al.

(10) Patent No.: US 10,173,281 B2
(45) Date of Patent: Jan. 8, 2019

(54) BONDED STRUCTURE OF DISSIMILAR METALLIC MATERIALS AND METHOD OF JOINING DISSIMILAR METALLIC MATERIALS

(71) Applicant: Nissan Motor Co., Ltd., Yokohama-shi, Kanagawa (JP)

(72) Inventors: Hiroshi Sakurai, Chigasaki (JP); Shigeyuki Nakagawa, Yokosuka (JP); Akira Fukushima, Zama (JP); Sadao Yanagida, Yokosuka (JP); Chika Sugi, Tokyo (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 876 days.

(21) Appl. No.: 14/169,984

(22) Filed: Jan. 31, 2014

(65) Prior Publication Data
US 2014/0144889 A1 May 29, 2014

Related U.S. Application Data

(62) Division of application No. 12/672,344, filed as application No. PCT/IB2008/002081 on Aug. 7, 2008, now abandoned.

(30) Foreign Application Priority Data

Aug. 10, 2007 (JP) .................................. 2007-209742
Apr. 18, 2008 (JP) .................................. 2008-108663

(51) Int. Cl.
*B23K 11/11* (2006.01)
*B23K 31/02* (2006.01)
(Continued)

(52) U.S. Cl.
CPC ............. *B23K 11/115* (2013.01); *B23K 11/20* (2013.01); *B23K 26/22* (2013.01); *B23K 26/323* (2015.10);
(Continued)

(58) Field of Classification Search
CPC ... B23K 11/115; B23K 11/20; B23K 2201/34; B23K 2203/10; B23K 2203/14; B23K 2203/18; B23K 2203/20; B23K 2203/24; B23K 26/22; B23K 26/323; B23K 31/02; B23K 11/16; B23K 11/163; B23K 11/166;
(Continued)

(56) References Cited

U.S. PATENT DOCUMENTS 5,205,877 A * 4/1993 Collier ..................... B21F 27/10
148/507
5,599,467 A * 2/1997 Okabe .................. B23K 11/185
219/118
(Continued)

*Primary Examiner* — Tu B Hoang
*Assistant Examiner* — Diallo I Duniver
(74) *Attorney, Agent, or Firm* — Young Basile Hanlon & MacFarlane, P.C.

(57) ABSTRACT

Disclosed herein are bonded structures and methods of forming the same. One embodiment of a bonded structure comprises first and second metallic layers and a bonding interface between the first and second metallic layers formed by diffusion and comprising a layer of at least one intermetallic compound. The intermetallic compound layer is formed in an area 52% or greater of an area of the bonding interface and has a thickness of 0.5 to 3.2 μm.

16 Claims, 8 Drawing Sheets

(51) Int. Cl.
*B23K 11/20* (2006.01)
*B23K 26/323* (2014.01)
*B23K 26/22* (2006.01)
*B23K 101/34* (2006.01)
*B23K 103/10* (2006.01)
*B23K 103/14* (2006.01)
*B23K 103/18* (2006.01)
*B23K 103/20* (2006.01)
*B23K 103/24* (2006.01)

(52) U.S. Cl.
CPC ...... *B23K 2101/34* (2018.08); *B23K 2103/10* (2018.08); *B23K 2103/14* (2018.08); *B23K 2103/18* (2018.08); *B23K 2103/20* (2018.08); *B23K 2103/24* (2018.08); *Y10T 428/12736* (2015.01)

(58) Field of Classification Search
CPC .... B23K 11/185; B23K 31/003; B23K 11/36; C03B 19/12; F03D 7/028; F03D 7/048; F05B 2270/1033; Y02E 10/723; Y10T 428/12736
USPC ..... 219/91.2, 78.02, 118; 228/193; 148/531, 148/526
See application file for complete search history.

(56) References Cited

U.S. PATENT DOCUMENTS

| | | | |
|---|---|---|---|
| 6,676,777 B2* | 1/2004 | Kimura | C21D 9/505 148/529 |
| 2006/0150387 A1* | 7/2006 | Kobayashi | B23K 11/166 29/458 |
| 2007/0006461 A1* | 1/2007 | McCrink | C21D 6/002 29/894.3 |

* cited by examiner

BONDED STRUCTURE OF DISSIMILAR METALLIC MATERIALS AND METHOD OF JOINING DISSIMILAR METALLIC MATERIALS

CROSS-REFERENCE TO RELATED APPLICATIONS

This application is a divisional application of U.S. patent application Ser. No. 12/672,344 filed on Feb. 5, 2010 and incorporated herein by reference in its entirety. This application claims priority from Japanese Patent Application Serial No. 2007-209742, filed Aug. 10, 2007, and Japanese Patent Application Serial No. 2008-108663, filed Apr. 18, 2008, each of which is incorporated herein in its entirety by reference.

TECHNICAL FIELD

The invention relates to bonding techniques for joining dissimilar metallic materials such as steel and aluminum alloy, steel and titanium alloy, and aluminum alloy and titanium alloy, at a bonding interface between which materials is formed an intermetallic compound. The present invention also relates to the resulting structures.

BACKGROUND

Summary of Lectures at Japan Welding Society Meeting, 77th series, pages 320 to 321, by Japan Welding Society, September 2005 discloses, for example, that when joining dissimilar metals consisting of steel and aluminum, if silica and oxygen exist at suitable densities in an intermetallic compound reaction layer formed at a joining interface, excess growth of a reaction layer can be suppressed and joining strength can be increased. In particular, by using a steel sheet adjusted so that an inner oxidation is 1.5 μm, a cross tensile strength of 1.4 kN (maximum) can be obtained by electric resistance spot welding and by combining the steel sheet with an aluminum alloy sheet (A6022) 1.6 mm thick.

Summary of Lectures at Japan Welding Society Meeting, 78th series, pages 162 to 163, by Japan Welding Society, April 2006 describes that at the time of spot welding 980 MPa grade alloyed molten zinc-plated steel sheets 1.2 mm thick with an aluminum alloy sheet (A6022) 1.0 mm thick, two-step energization stimulates softening and melting of a plated layer, whereby a wedge-shaped $Al_3Fe_2$ intermetallic compound is formed in a reaction interface layer resulting in a high cross tensile strength of 1.2 kN.

BRIEF SUMMARY

Disclosed herein are bonded structures and methods of making the same. One embodiment of a bonded structure comprises a first metallic layer, a second metallic layer overlying the first metallic layer, and a bonding interface between the first and second metallic layers formed by diffusion and comprising at least one intermetallic compound layer. The intermetallic compound layer is formed in an area 52% or greater of an area of the bonding interface and has a thickness of 0.5 to 3.2 μm.

A method of bonding dissimilar materials made from metals as disclosed herein comprises overlying a first metallic layer having a first melting point with a second metallic layer having a second melting point to form a bonding interface, wherein the first melting point is lower than the second melting point. The first and second metallic layers are rapidly heated and subsequently rapidly cooled. A compound layer is formed by diffusion comprising at least one intermetallic compound at the bonding interface by heat treating the first and second metallic layers at a heat treatment temperature equal to or greater than a temperature at which dislocation loops and voids formed by atomic vacancies resulting from the rapid cooling are at least partially eliminated by a main component metal of the first metallic layer.

Also disclosed herein is a method of increasing bond strength between a dissimilar metal of an iron-based alloy and a dissimilar metal of an aluminum-based alloy. The method comprises heat treating the dissimilar metals bonded by rapid heating and rapid cooling, the heat treating occurring at a temperature ranging from 130° C. to 440° C. A compound layer is thereby formed by diffusion at a bond interface containing at least one Fe—Al based intermetallic compound.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

The conventional methods discussed above for bonding or joining of dissimilar metallic materials inevitably produce inefficient joining conditions that are industrially unsuitable. If efficiency of conditions is attempted, a thick compound layer containing an intermetallic compound having a large grain size results without achieving the necessary strength. In view of this, an effort has been made to join members of dissimilar metals with high joining strength at the intermetallic layer at the joining interface in an efficient manner.

Hereinafter, a bonded structure of dissimilar metals and a method of bonding dissimilar metals according to the invention will be described further in detail and concretely with respect to certain embodiments.

Figure 1:
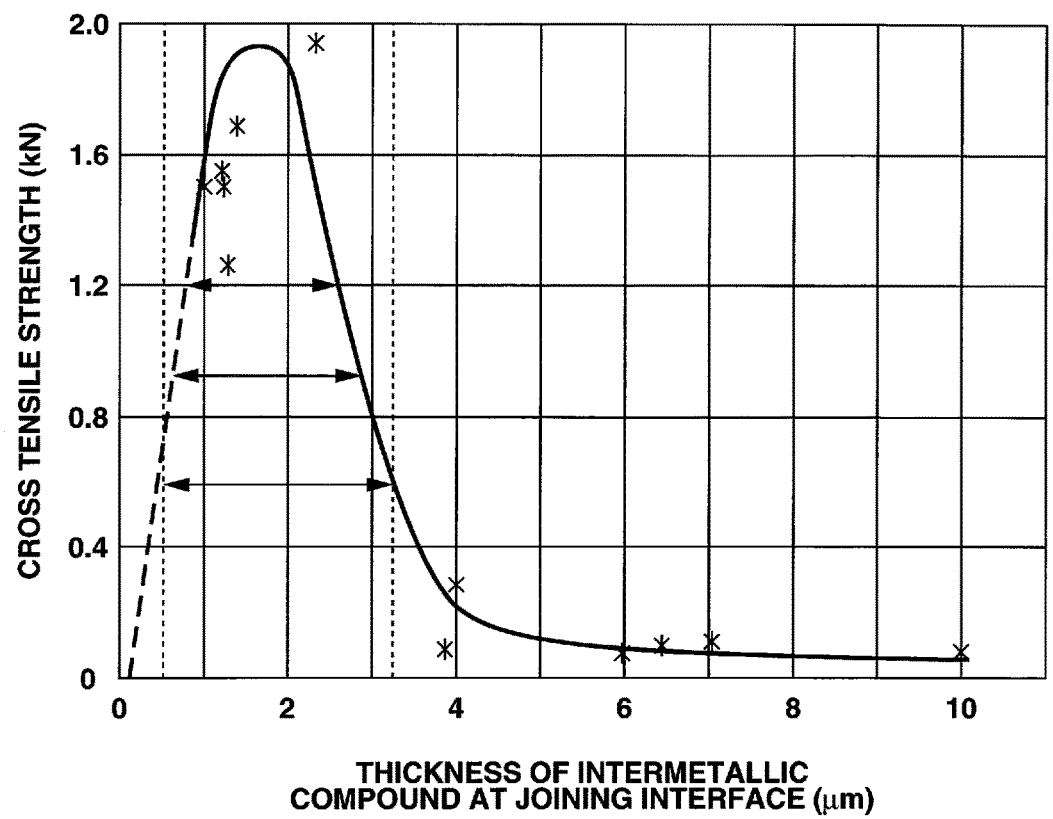
FIG. 1 is a graph showing a relation between a thickness and a cross tensile strength of a metallic compound layer formed at a bonding interface of steel and aluminum alloy.

FIG. 1 depicts the relationship between a thickness and a cross tensile strength of a metallic compound layer formed at a joining interface between a steel sheet of the thickness of 0.55 mm and a 6000 series aluminum alloy sheet. As used herein, the terms bonding and joining are interchangeable. The sheets are joined together by using an alternate current type spot welding device shown in FIG. 2 under various joining conditions, such as electric current of 20000 to 30000 A, pressurizing force of 150 to 600 kgf, and an energization time of 250 milliseconds or less. Thereafter, the sheets are heat treated under varied conditions, such as a treatment temperature of 140 to 500° C. and a treatment time of 20 minutes to 7 hours. For FIG. 1, the data was obtained under conditions wherein 90% or more of the intermetallic layer was 1 μm or less in thickness so that the thickness of the intermetallic compound layer formed at the bonding interface is as uniform as possible after welding. The cross tensile test was performed by using a test piece shaped and sized as shown in FIG. 3 and according to the method prescribed in Japanese Industrial Standard JIS Z3137 (entitled Specimen dimensions and procedure for cross tension testing resistance spot- and embossed projection-welded joints).

As apparent from FIG. 1, for obtaining a high strength bonded structure of dissimilar metals, it is necessary to control the thickness of a metallic compound layer formed at a constant area ratio by diffusion joining. It will be understood that for attaining a bonding strength of an aluminum alloy sheet material having a tensile strength of 210 MPa, i.e., a cross tensile strength of 0.6 kN or more, a control latitude of the thickness of the intermetallic compound layer should be set within the range from 0.5 to 3.2 μm. For attaining a cross tensile strength of 0.9 kN or more, the control latitude should be set within the range from 0.6 to 2.8 μm. For attaining a high strength of 1.2 kN or more, the thickness of the intermetallic compound layer should be set within the range from 0.8 to 2.5 μm. Namely, when the thickness of the intermetallic compound layer exceeds 3.2 μm, its contribution to the strength is lowered, and a sufficient strength cannot be obtained when the thickness is less than 0.5 μm. Accordingly, the thickness of the intermetallic compound layer should be set within the range at least from about 0.8 to about 2.5 μm.

In the joining nugget formed by a spot welding device, the intermetallic compound is not always formed at the entire area of the nugget (joining surface), but a compound thickness distribution was seen within the nugget. The area ratio of the intermetallic compound layer formed with the above-described thickness and strength was obtained by observing the central cross section of the joining portion, measuring the length by which the thickness of the intermetallic compound is within the above-described range, assuming that donut-shaped joining zones are formed concentric with the nugget, and calculating, from the distance of the center of the nugget, the ratio of the sum of the areas of the joining zones, to the nugget area (joining area). The result is shown in FIG. 4.

Figure 4:
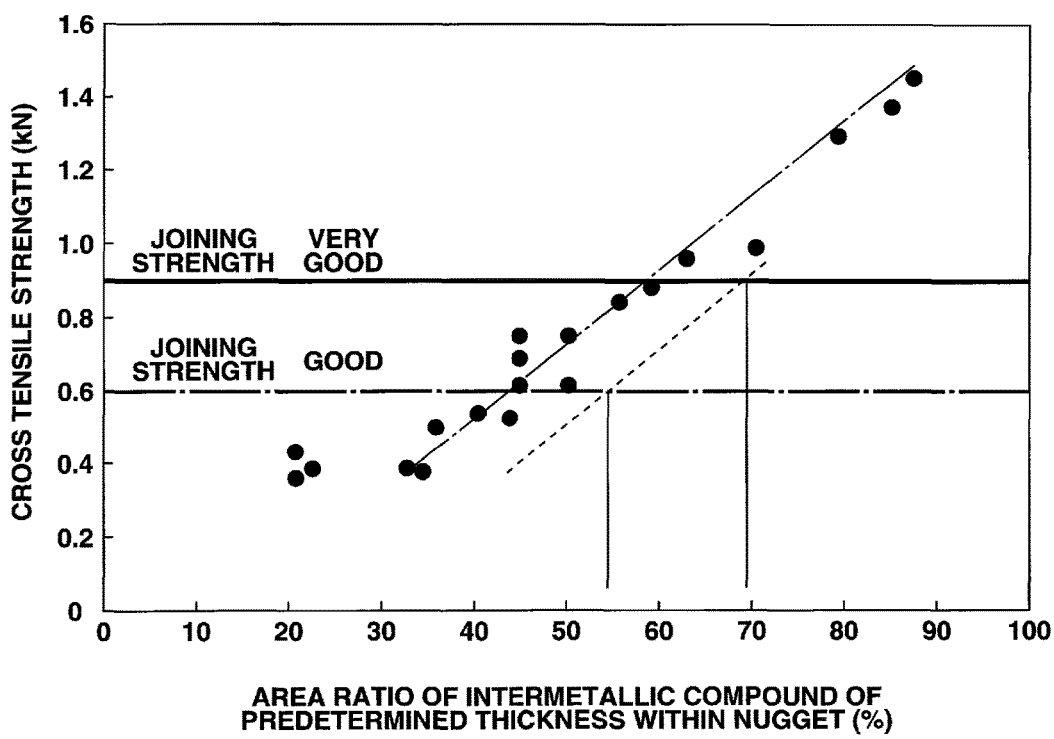
FIG. 4 is a graph showing a relation between an area ratio and a joining strength within a nugget of an intermetallic compound layer of the thickness ranging from 0.5 to 3.2 μm.

According to FIG. 4, if the ratio of the area at which the intermetallic compound layer was formed so as to have the thickness in the range from 0.8 to 2.5 μm to the joining area was 52% or more, a good joining strength was exhibited even at the lower limit of variations. When the area ratio increased to 70% or more, the joining strength further increased and a sufficient cross tensile strength of 0.9 kN or more could be attained.

Figure 5:
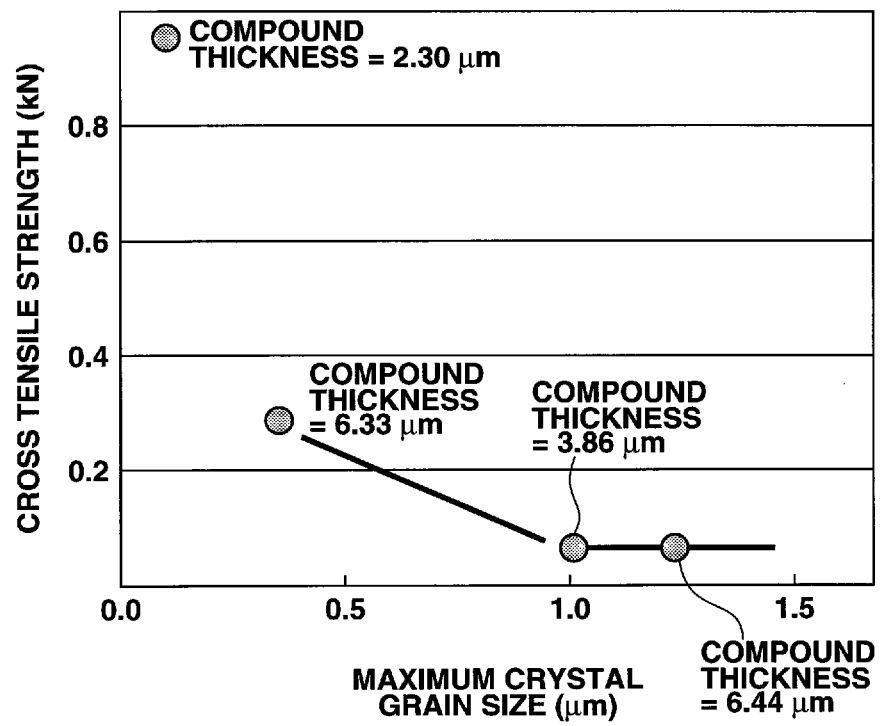
FIG. 5 is a graph showing a relation between a maximum value of a crystal grain size and a joining strength of an intermetallic compound layer.

FIG. 5 shows the influence of a maximum crystal grain size as measured along the longitudinal diameter of an intermetallic compound on a joining strength. It is seen that even if the thickness of the intermetallic compound layer becomes a little larger, the joining strength is increased if the crystal grain is small.

The rapid heating process and rapid cooling process introduces lattice defect and crystal restoration during the joining process. The structural variation of the crystal grain at the joining interface of the intermetallic compound was refined by the heat treatment subsequent to the joining process. For the crystal grain to grow or disappear, atoms need to move in the material, that is, diffusion is necessary. The structure formed by the rapid heating process and the rapid cooling process has a high system energy. For example, the rapid cooling process introduces composition inclination, many voids and dislocation. A metallic structure in such a high-energy condition is changed by heat treatment, reducing the structure to a low energy condition. Representative examples are phenomena such as uniformalization of composition inclination, growth or disappearance of crystal grain, disappearance of dislocation loops and voids that are formed by gathering of atomic vacancies, and changing of crystal grain boundaries to low energy grain boundaries.

Under high temperature conditions, a number of atomic vacancies are contained in a lattice, but if the metallic system is rapidly cooled from such a high temperature condition, vacancies exist in the cooled lattice with a high density. Such supersaturated vacancies increase the system energy. In case of heat treatment of a normal structure, since there exists vacancies in only the amount that is admitted thermodynamically, diffusion caused by the heat treatment is restricted by the amount of vacancies and the speed of movement of vacancy. But by heat treatment of the structure having an excess amount of vacancies due to rapid cooling, diffusion in excess of that caused by normal heat treatment can occur. To cause growth and disappearance of crystal grains, it is necessary to elevate the temperature for a prolonged time to attain a sufficient amount of vacancies and atomic movement. However, because a sufficient amount of vacancies exist in the crystal lattice, sufficient diffusion and reaction can occur even at a relatively low temperature.

Refinement of crystal grain, which is a feature of a structural change of the embodiments disclosed herein, can occur under a heat treatment condition in which the number (frequency) of crystal nucleus formations is high and the grain growth speed is not so high. The low-temperature heat treatment of the rapidly cooled structure can increase the number (frequency) of nucleus formations due to the excess amount of vacancies and can avoid, during the grain growth thereafter, coarsening of the crystal grains.

For performing heat treatment under such a condition, high-temperature heat treatment leading to coarsening of the crystal grain should be avoided, and the temperature sufficient to move the vacancies introduced by the rapid heating process and the rapid cooling process should be set to the lower limit value of the heat treatment temperature. Namely, for restoration of the metallic structure, heat treatment should be performed not at the temperature at which the electric resistance is restored but at the temperature at which disappearance of the voids or dislocation loops formed by gathering of atomic vacancies occurs. Regarding crystal restoration, a detailed description is found in "Theory of Dislocation", pp. 229-235, edited by Japan Metal Society and issued by Maruzen Co., Ltd. It can be said that, for disappearance of voids that are formed by gathering of atomic vacancies or distinction of dislocation loops, heat treatment is performed at the temperature for the "V step" or more of restoration of a metal structure.

For the crystal grain growth of the intermetallic compound in the diffusion joining interface between metallic materials of different melting points, sufficient diffusion of either base metal needs to occur. Since the lower melting point base metal causes diffusion at the lower temperature, the grain growth of the intermetallic compound at the interface is ruled by the diffusion of the lower melting point base metal. For example, in the joining of iron and aluminum, refinement of crystal grains by heat treatment of a rapidly heated and rapidly cooled structure, represented by electric resistance welding, starts to occur when the V step of restoration of an aluminum-base alloy is reached. This is because aluminum is a base material of a lower melting point as compared with an iron-based alloy, i.e., at the temperature of 127° C. (400K) or more. This temperature coincides with the temperature for causing disappearance of dislocation loops and voids that are formed by gathering of the atomic vacancies of the rapidly cooled structure of the aluminum-base metal as the base metal. The structure caused by the rapidly heating process and the rapidly cooling process changes into a stable structure.

As having been described above, movement of the vacancies in the low melting point base metal lattice is a heat treatment condition of the embodiments herein. But for efficiently obtaining a target structure within a short time, it is desirable to perform heat treatment at the temperature that causes sufficient diffusion. A sufficient diffusion effect can be expected by setting the heat treatment temperature so as to be equal to or higher than ½ of the melting point expressed by absolute temperature of the low melting point side base material.

On the other hand, when heat treatment is performed at the temperature equal to or higher than ½ of the melting point expressed by absolute temperature of the low melting point base material and at a higher temperature in case of a precipitation strengthened alloy for instance, the temperature at which the precipitation phase disappears is reached. Further, in case the strength is obtained by work hardening, the strength of the base material is lowered by recrystallization. If the precipitation phase, which strengthens the base material, disappears, the joining strength itself cannot be improved even if the strength of the joining portion is increased. Accordingly, the heat treatment after joining must allow the strength of the base material to be maintained at the strength necessary for a structured body. Namely, heat treatment is performed at the temperature equal to or lower than the temperature at which the low melting point base material is softened due to disappearance of the precipitation strengthening phase or recrystallization.

Diffusion of the low melting point side base metal needs be sufficient, but if diffusion within intermetallic compound grains is excessive, it is possible that the strength cannot be attained due to the coarsening of the grains of the intermetallic compound. To avoid such coarsening of the grains of the intermetallic compound, it is necessary to perform heat treatment at a temperature that causes diffusion within the intermetallic compound grains of the joining portion sufficiently, i.e., that enables the vacancies to move easily within the intermetallic compound. This temperature can be the temperature equal to or lower than ½ of the melting point expressed by absolute temperature of the intermetallic compound whose melting point is lowest. A desired temperature range is one that causes movement of the vacancies within the low melting point side lattice and does not coarsen the metallic compound grains, thereby attaining a sufficient strength of the base material. It has been discovered that it is industrially most effective to perform heat treatment at a highest possible temperature within that temperature range. Namely, the heat treatment needs to be performed at the temperature equal to or lower than one of: ½ of the melting point expressed by absolute temperature of the intermetallic compound whose melting point is lowest among the formed intermetallic compounds and the temperature at which the low melting point side metallic material is softened by disappearance of precipitation strengthening phase or recrystallization.

By energy dispersive x-ray (EDX) analysis of Al—Fe based intermetallic compounds, a component ratio of the Al/Fe atomic ratio was observed to be close to 3:1 or 5:2, and it was judged from this component ratio that the intermetallic compounds were $Al_3Fe$ and $Al_5Fe_2$. The melting points of those intermetallic compounds are higher than the melting point of aluminum, 660° C. The melting points of $Al_3Fe$ and $Al_5Fe_2$ are 1160° C. and 1169° C., respectively. The aimed temperature for causing movement of the vacancies within the intermetallic compound structure can be set at ½ of the melting points expressed by absolute temperature, i.e., about 440° C. To change the structure formed by the rapid heating process and the rapid cooling process into a stable structure without causing coarsening of the intermetallic compound, it is preferable to elevate the temperature equal to or higher than the temperature that eliminates the dislocation loops and voids that are formed by gathering of the atomic vacancies of the rapidly cooled structure of the low melting point side base material, more preferably ½ of the melting point expressed by absolute temperature of the main component metal of the low melting point side metallic material. If heating is carried out at a temperature exceeding this temperature, coarsening of the intermetallic compound grains was caused.

In diffusion joining, the joining strength becomes insufficient if the intermetallic compound is too thin. If the process temperature is elevated to achieve higher production efficiency, the resulting intermetallic compound grains are liable to be coarsened, possibly causing a fragile characteristic. In diffusion joining, since the joining is generally performed in a temperature range in which the diffusion speed is sufficiently large, the intermetallic compound crystal grains are liable to be coarsened. If it is tried to refine the crystal grains, a long processing time is necessitated and an impracticable processing time is required for application to industrial production. In welding, since the temperature becomes high enough to reach the melting point, coarsening of the intermetallic compound occurs in almost all cases.

As disclosed herein, by once causing electric resistance heating at the joining interface, forming a structure of a composition in an unequilibrium state and of a uniform thickness and thereafter performing heat treatment at the temperature equal to or higher than the temperature for causing disappearance of dislocation loops and voids that are formed by gathering of the atomic vacancies of the rapidly cooled structure of the low melting point metal, the intermetallic compound layer having a uniform thickness at the time of joining of dissimilar metallic materials is thereby obtained. In addition to refining the compound structure of an unequilibrium composition, a strong intermetallic compound layer of refined crystal grains and moreover having a uniform thickness can be formed.

In embodiments herein, for dissimilar metallic materials, a combination of Fe-based alloy and Al-based alloy can be used suitably. The Fe-based alloy is herein intended to mean an alloy containing Fe as a main component, and more specifically rolled steel of carbon steel, alloy steel, soft steel, high tensile steel or the like. Further, Al-based alloy is intended to mean an alloy containing Al as a major component, and aluminum alloys from 1000 to 7000 series can be used suitably. As used herein, "major component" is intended to indicate a metal that is contained in the largest amount in an alloy. There is not any limitation to the combination of the dissimilar metallic materials used in the embodiments herein provided that the combination is such that the materials contain, as main components, such metals that form intermetallic compounds at the interface by diffusion, wherein the diffusion is caused by a processing that utilizes a rapid heating process and a subsequent rapid cooling process due to cooling of the materials as electric resistant joining as described above. Examples of a combination of such metal elements are a combination of Ti (titan) and Al (aluminum) and a combination of Ti and Fe (iron).

In the embodiments herein, if the dissimilar metallic materials includes a combination of Al-based alloy and Fe-based alloy, the above-described heat treatment can be performed at the temperature equal to or higher than the temperature that makes the main component metal of the low melting point side metallic material cause disappearance of dislocation loops and voids that are formed by gathering of the atomic vacancies of the rapidly cooled structure, i.e., 127° C. and in the temperature range from about 130 to about 440° C., which temperature range is calculated from ½ of the melting point expressed by absolute temperature of the intermetallic compound. Further, from the point of view of performing heat treatment in the temperature range equal to or lower than ½ of the melting point expressed by absolute temperature of the intermetallic compound whose melting point is lowest amount the formed intermetallic compounds, the temperature range equal to or higher than about 190° C. is desirable. Further, from the point of view of performing the heat treatment in the temperature range equal to or lower than one of: ½ of the melting point expressed by absolute temperature of the intermetallic compound whose melting point is lowest among the formed intermetallic compounds and the temperature at which the low melting point side metallic material is softened by disappearance of the precipitation strengthening phase or recrystallization, the temperature range equal to or lower than about 410° C. is preferable.

A zinc-plated steel sheet can be used as the Fe-base alloy. By causing eutectic fusion between zinc forming a plating layer and aluminum and pressurizing the same, it becomes possible to remove the oxide coating formed on the surface of the Al-based alloy together with the fused eutectic material. It also becomes possible to attain diffusion joining of new surfaces of both metallic materials from which the zinc-plating layer and the oxide coating are removed.

Figure 2:
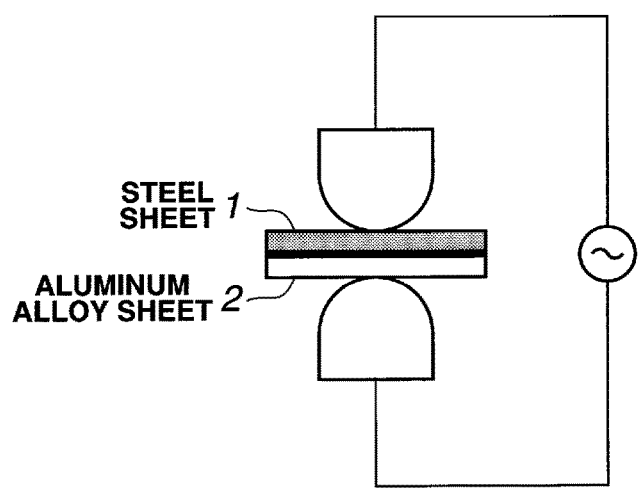
FIG. 2 is a schematic of a spot welding device used for joining dissimilar metallic materials disclosed herein.
Figure 3:
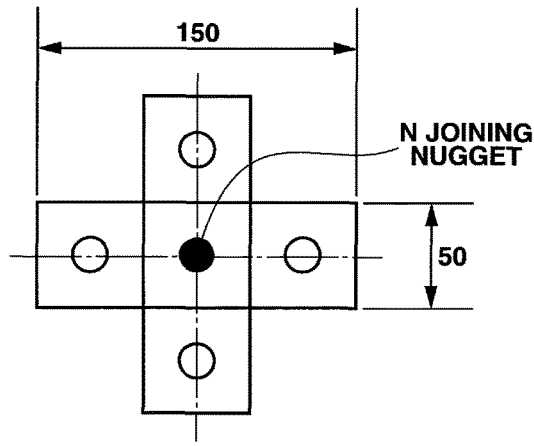
FIG. 3 is a plan view showing the shape of a test piece for cross tensile testing that is used for evaluation of a joining strength.

In the method of joining dissimilar metals disclosed herein, for the joining including a rapid heating process and a subsequent rapid cooling process, the electric resistance joining using a spot welding device shown in FIG. 2 can be representatively employed. However, this is an example and the invention is not limited to the use such resistance heating. Another heating means such as laser beam can be used. Further, the spot joining by nugget formation is also an example and is not limiting, and, by using a roller-shaped electrode, seam joining can be performed. In the method of joining dissimilar metals disclosed herein, if the joined member obtained is to be painted, the heat treatment subsequent to the above-described joining and baking of the paint in the painting process can be performed at the same time. By this, the heating process can be omitted, and energy can be conserved.

Figure 6:
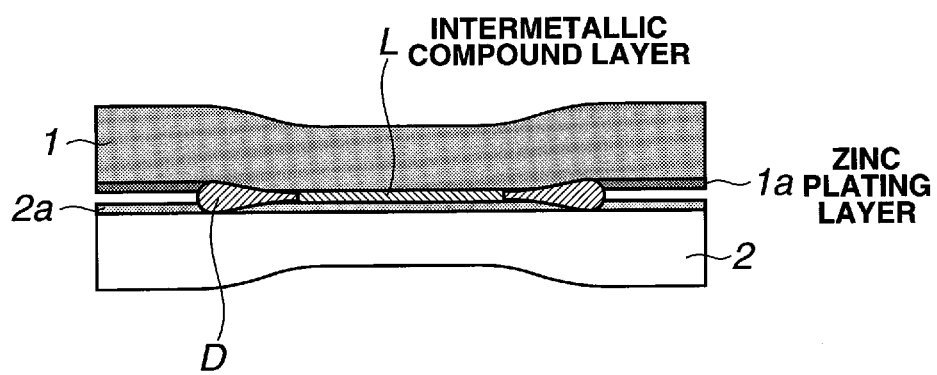
FIG. 6 is a cross-sectional view showing a joining structure of a zinc-plated steel sheet and an aluminum alloy, which is obtained as disclosed herein.

For a first embodiment, by using an alternate type spot welding device shown in FIG. 2, a Zn-plated steel sheet 2 of the thickness of 0.55 mm and a 6000 series aluminum alloy sheet 2 having a tensile strength of 200 MPa are laid one upon the other and resistance spot joining thereof is executed under a condition of a pressurizing force of 300 kN, a current of 24000 A and an energizing time of 0.2 sec. At the time of joining, aluminum and zinc of the plating layer were once reacted at the temperature of 400° C. to thereby cause eutectic fusion thereof. An oxide coating 2a on the surface of the aluminum alloy sheet 2 was ejected, as shown in FIG. 6, by electrode pressurization by the welding device. The ejected oxide coating, as ejected matter D, together with a fused eutectic material formed thereby cause a new surface of the aluminum alloy sheet 2 while causing diffusion reaction. Diffusion layers were formed on the steel sheet 1 and the aluminum alloy sheet 2 without melting the aluminum alloy. Fe and Al were reacted within the diffusion layers to form a thin intermetallic compound layer L, and the dissimilar metallic materials 1 and 2 were joined by way of the intermetallic compound layer L.

Figure 7A:
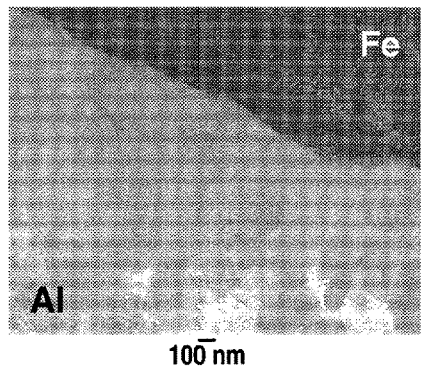
FIG. 7A is a transmission electron microscopy photograph showing a state of a joining structure before heat treatment of a first embodiment.

As a result, the aluminum oxide coating 2a on the surface of the aluminum alloy sheet 2 is ejected together with Zn—Al reaction phase, i.e., an eutectic alloy, to the place around the nugget. The thin intermetallic compound layer L having the thickness in the range from 0.8 to 2.5 μm is formed at the joining interface and in a region equal to 48% of the joining area (nugget area), and the intermetallic compound crystal grain of the intermetallic compound layer L is elliptical in sectional shape, the long diameter being about 0.3 μm. A transmission electron microscopy photograph of the joining portion is shown in FIG. 7A.

Figure 7B:
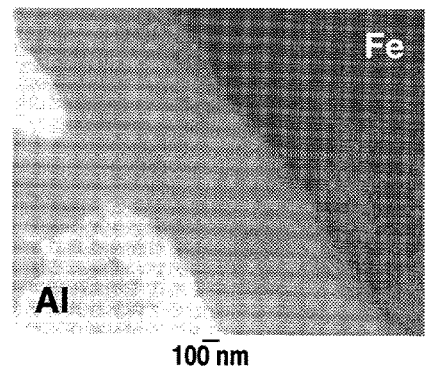
FIG. 7B is a transmission electron microscopy photograph showing a state of a joining structure after heat treatment of a first embodiment.
Figure 7C:
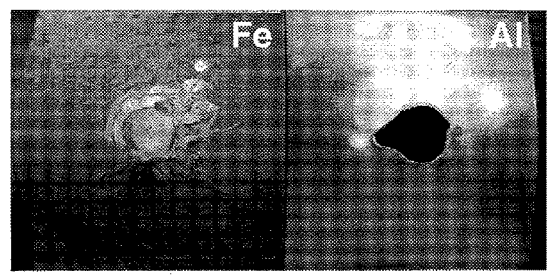
FIG. 7C is an outward appearance photograph showing a fracture state of a test piece by a cross tensile test of a first embodiment.

Then, the joined member prepared in this manner is subjected to heat treatment at 440° C. for 1.5 hours, and it was confirmed that the entire intermetallic layer came to have the thickness ranging from 0.8 to 2.5 μm and was formed in the region equal to 89% of the joining area. At the same time, the intermetallic compound grains were changed in an equiaxed manner and the crystal grains could be refined so as to have a grain size of 0.1 μm or less. A transmission electron microscopy photograph is shown in FIG. 7B. As a result of measurement of the strength of the joined member having been heat treated at 440° C. for 1.5 hours by a cross tensile test, the outline of which is shown in FIG. 3, the joining strength of 1.60 kN was obtained, and it was confirmed that fracture was caused at the aluminum alloy side as shown in FIG. 7C. In the meantime, as a result of investigation on the above-described intermetallic compound layer L by EDS and X-ray diffraction analysis, it was confirmed that the compound layer was constituted by intermetallic compounds having Fe—Al component ratios close to $FeAl_3$ and $Fe_5Al_2$, and Zinc of the plating layer was so scarcely contained in the intermetallic compound as not to be found by the analysis.

Figure 8:
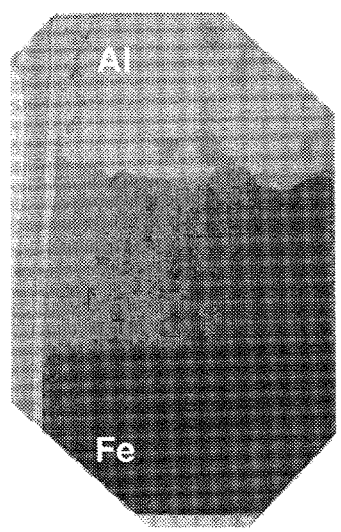
FIG. 8 is a transmission electron microscopy photograph showing a joining structure obtained by a comparative example 1.

For comparative example 1, the joined member was obtained under the same condition as the first embodiment. The joined member was heat treated at 500° C. for 0.5 hours. The intermetallic compound layer came to have the thickness exceeding 3.2 μm, the area ratio thereof was 98%, and the diffusion joining layer had the interface having the intermetallic compound layer. However, there was scarcely any joining layer in which the thickness of the intermetallic compound layer was 3.2 μm or less and the joining area was 2%. Further, it was observed that the crystal grains were changed to constitute two layers, an equiaxed portion and a post-like portion. The crystal grains at the equiaxed portion were in the range from 0.1 to 0.2 μm, and the crystal grains at the post-like portion extended vertically so as to have a maximum long diameter close to 1.0 μm. A transmission electron microscopy photograph in this case is shown in FIG. 8. In the cross tensile strength, fracture was caused at the joining interface and the strength obtained was only about 0.09 kN.

For comparative example 2, the same spot welding device as the above-described first embodiment was used. After a Zn-plated steel sheet 1 of the thickness of 0.55 mm and a 6000 series aluminum alloy sheet 2 of the thickness of 1.0 mm were laid one upon the other, resistance spot joining was performed under a condition of a pressuring force of 300 kN, current being made smaller than that of the first embodiment and of 20000 A and an energization time of 0.2 sec. for thereby joining the dissimilar metallic materials by diffusion joining. As a result, an intermetallic compound layer L was formed and the region of the thickness in the range from 0.8 to 2.5 μm was 46% of the joining area. Further, the maximum long diameter of the crystal grains of the intermetallic compound constituting the intermetallic compound layer L was 0.06 μm.

Figure 9A:
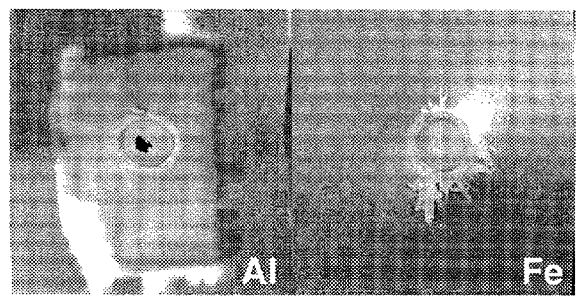
FIG. 9A is an outward appearance photograph showing a fracture state of a test piece by a cross tensile test of a comparative example 2.

FIG. 9A shows a fracture state of a test piece in case the cross tensile test was executed without processing the joined member obtained in the manner as described above by heat treatment. Although the nugget partly remained on the steel sheet side, it was mostly fractured and peeled off from the joining interface, and the strength of 0.67 kN was obtained.

Figure 9B:
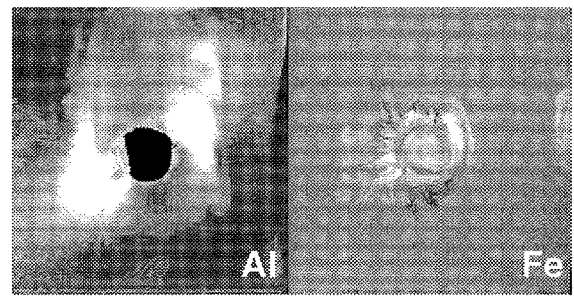
FIG. 9B is an outward appearance photograph showing a fracture state of a test piece by a cross tensile test of a second embodiment.

A second embodiment was a result of heat treating the joined member prepared under the same conditions as the comparative example 2, at 440° C. for 1.5 hours. It was confirmed that the area of the intermetallic compound layer L having the thickness in the range from 0.8 to 2.5 μm was enlarged to 90% of the joining area, and the crystal grains of the intermetallic compound were changed in an equiaxed manner and refined so that the grain size was 0.1 μm. FIG. 9B shows a fracture state of a test piece where the cross tensile test was executed after the above-described heat treatment. Plug fracture was caused, and the cross tensile strength reached to 1.69 kN. In this manner, a fracture strength that was relatively high as compared with the base material strength was obtained, though there occurred a change to a plug fracture mode. Without being bound to theory, this is considered due to an influence of an increase of the base material strength, which was caused by aging of the aluminum alloy. In contrast to fracture being a peel off type before heat treatment, fracture was not started at the joining interface but at the base material, signifying an increase of the strength of the joining interface.

Figure 9C:
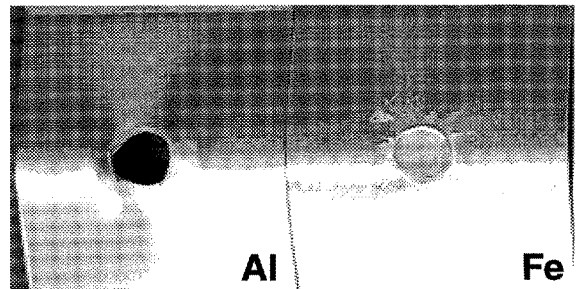
FIG. 9C is an outward appearance photograph showing a fracture state of a test piece by a cross tensile test of a third embodiment.

A third embodiment of the joined member was prepared under the same condition as the above-described comparative example 2 but was heat treated at 300° C. for 7 hours. As a result, the region of the intermetallic compound layer L having the thickness in the range from 0.8 to 2.5 μm was enlarged to account for 82% of the joining area. Regarding the crystal grains of the intermetallic compound, it was confirmed that the crystal grains changed in an equiaxed manner and were refined so as to have the grain size in the range from 0.05 to 0.1 μm. FIG. 9C shows a fracture state of a test piece where the cross tensile test was executed after the above-described heat treatment. The cross tensile strength was 1.50 kN, and it was possible to cause nugget fracture.

Figure 9D:
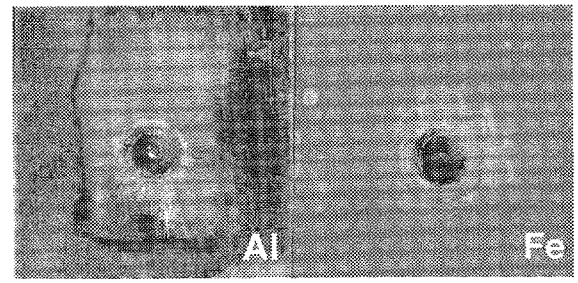
FIG. 9D is an outward appearance photograph showing a fracture state of a test piece by a cross tensile test of a comparative example 3.

Comparative example 3 was a result of heat treating a joined member prepared under the same condition as the above-described comparative example 2, but at 500° C. for one hour. It was observed that the intermetallic compound layer L grew so as to have a thickness exceeding 3.2 μm, and the area thereof was enlarged to almost 100% of the joining area. The crystal grains of the intermetallic compound were changed to constitute two layers, an equiaxed portion and a post-like portion. The grain size was in the range from 0.1 to 0.3 μm at the equiaxed portion, and the maximum long diameter of the crystal grains at the post-like portion was 1.8 μm. FIG. 9D shows a fracture state of a test piece in case the cross tensile test was executed after the joined member was heat treated at 500° C. for one hour. Interface fracture was caused, and the cross tensile test result was only 0.08 kN. In this manner, a sufficient strength can be realized by controlling the thickness and area of the intermetallic compound layer to within a predetermined range. Where a sufficiently thin intermetallic compound layer is formed at a joining process prior to heat treatment, the strength can be increased by making, by subsequent heat treatment, the thickness of the intermetallic compound increase within the limits that enable refinement of the grain size of the intermetallic compound. Where, to the contrary, the intermetallic compound layer formed at the joining step becomes relatively thick, the quality of the joining portion of dissimilar metals can be stabilized by refining the crystal grains while selecting a heat treatment condition that does not cause the intermetallic compound layer to increase in thickness. In this manner, by a process of forming a rapidly heated and cooled structure, a typical example of which is electric resistant joining, and a subsequent heat treatment process, a joining portion of dissimilar metals having a high quality can be obtained stably. In addition, by combining thereto an aging condition or the like, a joining of dissimilar metals can result in higher strength.

Figure 10A:
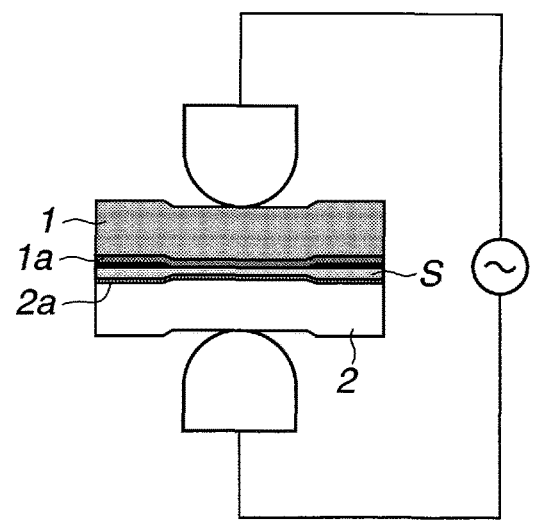
FIG. 10A is a schematic showing an outline of joining of dissimilar metallic materials according to a fourth embodiment, together with a spot welding device.
Figure 10B:
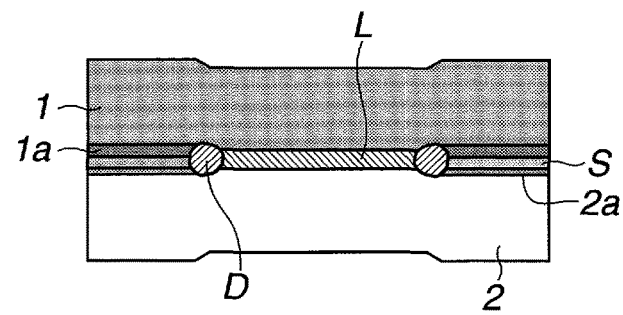
FIG. 10B is a cross-sectional view showing a joining structure of a zinc-plated steel sheet and an aluminum alloy, which is obtained by the fourth embodiment.

As a fourth embodiment, shown in FIG. 10A, a molten zinc plating steel sheet 1 of the thickness of 0.55 mm and a 6000 series aluminum alloy sheet 2 having the tensile strength of 210 MPa and the thickness of 1.0 mm was laid one upon the other by way of a thermo-hardening adhesive agent S, and resistant spot joining thereof was performed under the condition of a pressuring force of 300 kN, a current of 24000 A and an energizing time of 0.2 sec. to thereby join dissimilar metallic materials by diffusion joining without melting the aluminum alloy sheet 2. At this time, aluminum and zinc of the plating layer were once reacted at the temperature of 400° C. to thereby cause eutectic fusion thereof. An oxide coating 2a of the aluminum ally sheet 2 and the adhesive agent were ejected by electrode pressurization by the welding device as ejected matter, which together with a fused eutectic material formed, thereby caused a new surface of the aluminum alloy sheet 2. Diffusion layers were formed on the steel sheet 1 and the aluminum alloy sheet 2. An intermetallic compound layer L was formed at the joining interface, and, as shown in FIG. 10B, the dissimilar metallic materials 1 and 2 were joined by way of the intermetallic compound layer L without melting the aluminum alloy.

Figure 10C:
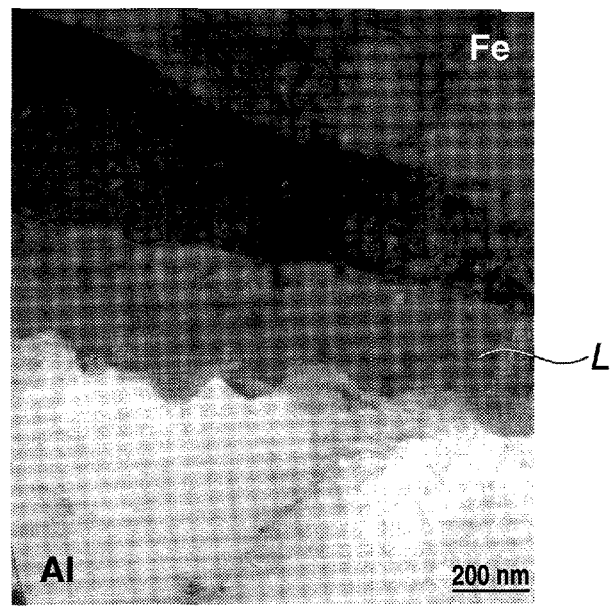
FIG. 10C is a transmission electron microscopy photograph showing a joining structure obtained by the fourth embodiment.

Thereafter, by performing heat treatment at 170° C., which is the hardening temperature of the above-described adhesive agent S, the intermetallic compound L was formed in the region of 56% of the joining area so as to have a thickness in the range from 0.8 to 2.5 μm. It was observed that the crystal grains of the intermetallic compound were refined so that a maximum long diameter was in the range from 0.05 to 0.1 μm (refer to FIG. 10C). As a result of performing the cross tensile test similarly, a joining strength of 0.94 kN was obtained.

In this embodiment, by heat treatment at one time, the adhesive agent S can be hardened simultaneously with refinement of the intermetallic compound layer to thereby form an insulation layer between the dissimilar metallic materials, thus making it possible to improve the joining strength and the corrosion resistant ability without increasing the number of process steps and the amount of invested energy. In the meantime, it is needless to say that such a technique can similarly be applied to the case the member is painted after joining.

Figure 11:
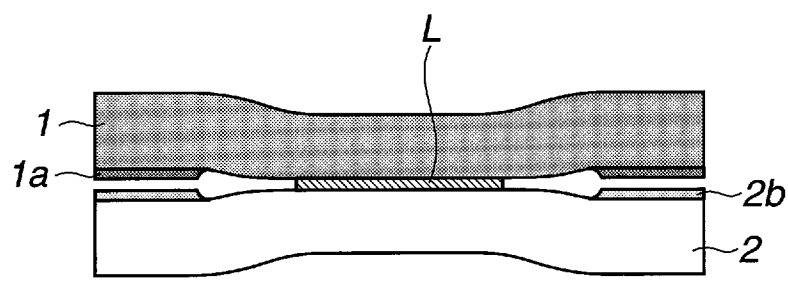
FIG. 11 is a transmission electron microscopy photograph showing a joining structure obtained by a fifth embodiment.

To make a fifth embodiment, at the time of joining dissimilar metals consisting of a steel sheet 1 and an aluminum alloy sheet 2, the alternate type spot welding device shown in FIG. 2 was used, and the same operations as the first embodiment were repeated except that a zinc-plating layer 2b was applied onto the surface of the aluminum alloy sheet 2. The joined member of dissimilar metals of the fifth embodiment is shown in FIG. 11. As a result, an intermetallic compound layer L having the thickness in the range from 0.5 to 3.5 μm was formed at the joining interface, and the region of the intermetallic compound layer having the thickness in the range from 0.8 to 2.5 μm was 56% of the joining area. It was found that the maximum long diameter of the intermetallic compound layer grains was 0.05 μm. Further, as a result of performing the cross tensile test, the joining strength of 1.2 kN was obtained Generally, a strong, high-melting point oxide coating exists on the surface of the aluminum alloy 2 and its removal is a problem at the time of diffusion joining. But since in this embodiment the oxide coating has been removed at the process of applying a zinc-plating to the aluminum alloy sheet 2 and a new surface of the aluminum alloy sheet 2 is exposed by melt removal, diffusion joining of the aluminum alloy sheet with the steel sheet by energization heating is possible.

Figure 12:
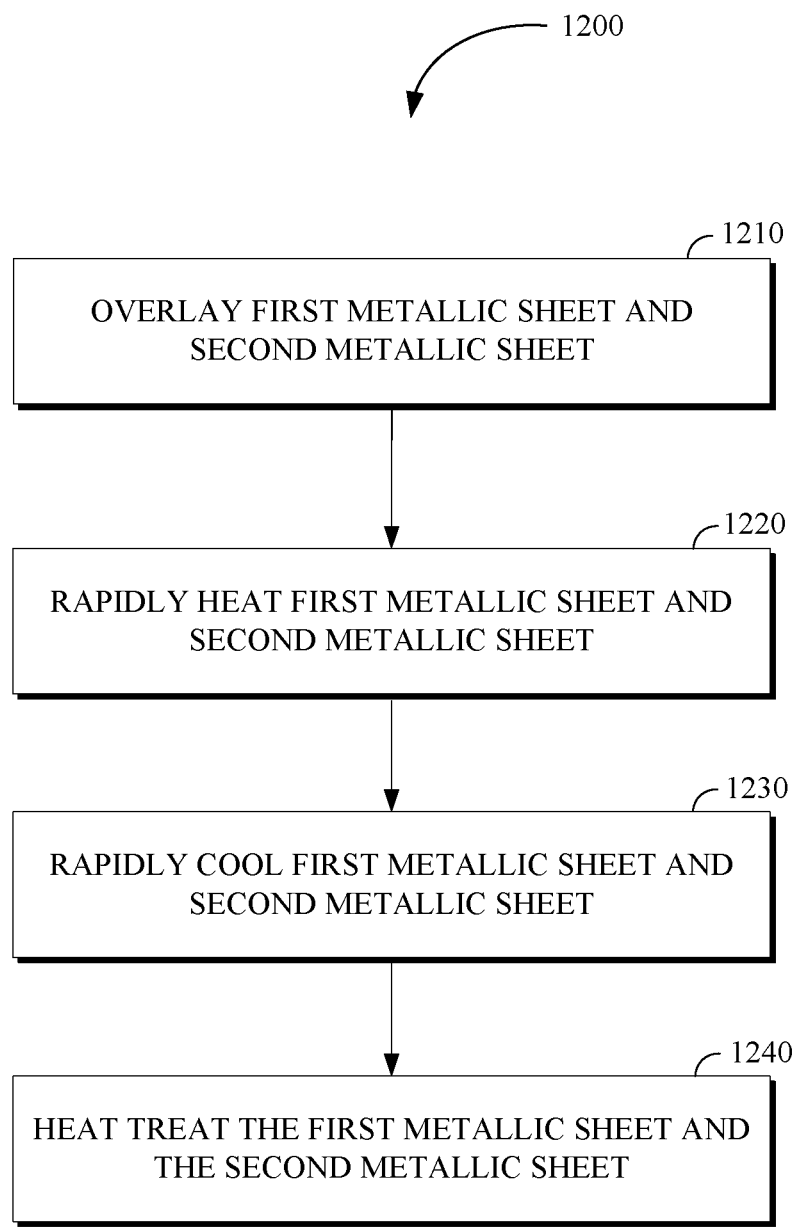
FIG. 12 is a flow chart diagram of the steps of a method for joining dissimilar metallic materials disclosed herein.

FIG. 12 shows a flow chart diagram of the steps of a method 1200 for joining dissimilar metallic materials disclosed herein.

At operation 1210, overlying a first metallic sheet, with a first melting point, and a second metallic sheet, with a second melting point, wherein the first melting point is lower than the second melting point.

At operation 1220, rapidly heating the first metallic sheet and the second metallic sheet while using pressurizing force to create a joining nugget;

At operation 1230, rapidly cooling the first metallic sheet and the second metallic sheet.

At operation 1240, forming a compound layer by diffusion comprising at least one intermetallic compound at the joining nugget by heat treating the first metallic sheet and the second metallic sheet at a heat treatment temperature equal to or greater than a temperature at which dislocation loops and voids formed by atomic vacancies resulting from the rapid cooling are at least partially eliminated by a main component metal of the first metallic sheet, wherein the heat treatment temperature is within a temperature range equal to or lower than one-half of a melting point, in absolute temperature, of the at least one intermetallic compound with the lowest melting point.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method of bonding dissimilar materials made from metals comprising:
    overlying, to form a bonding interface, a first metallic sheet that is an aluminum-based alloy sheet, wherein aluminum is a main component metal of the first metallic sheet, and a second metallic sheet that is an iron-based alloy sheet the aluminum having a lower melting point than the iron;
    forming, between the aluminum alloy sheet and the iron alloy sheet, a joining nugget comprising an intermetallic compound of iron and aluminum by:
        using electric resistance heating, heating the first metallic sheet and the second metallic sheet, at a temperature higher than 400° C., while using pressurizing force to create the joining nugget,
            the heating causing atomic vacancies in the intermetallic compound, and
            the first metallic sheet, the second metallic sheet, and the intermetallic compound forming a structure; and
        cooling the structure, to less than 127° C., thereby causing dislocation loops and voids in the intermetallic compound formed by a gathering of the atomic vacancies; and
    heat treating, in a baking apparatus and simultaneously with a painting process, the structure at a heat treatment temperature selected from a temperature range of 130° C. to 440° C.,
        wherein the temperature range consists of temperatures equal to or lower than one-half of a melting point, in absolute temperature, of the aluminum of the intermetallic compound, and
        wherein any temperature in the temperature range causes, in the heat treating, the dislocation loops and voids to be eliminated by the main component metal of the first metallic sheet.

2. The method of claim 1 wherein the heat treatment temperature is equal to or higher than one-half of a melting point in absolute temperature of the main component metal of the first metallic sheet.

3. The method of claim 1 wherein the heat treatment temperature is a temperature at which the first metallic sheet is softened by disappearance of a precipitation strengthening phase or recrystallization.

4. The method of claim 1, wherein the heating occurs by electric resistance joining by energization heating.

5. The method of claim 1, wherein the intermetallic compound is comprised of a crystal grain with a maximum diameter of 0.1 µm or less.

6. The method of claim 1, wherein the intermetallic compound is formed in an area 70% or greater of an area of the joining nugget.

7. The method of claim 1, wherein the intermetallic compound has a thickness of 0.6 to 2.8 µm.

8. The method of claim 1, wherein the intermetallic compound has a thickness of 0.8 to 2.5 µm.

9. The method of claim 1, wherein the intermetallic compound comprises an Fe—Al based compound.

10. The method of claim 1, wherein the heat treatment temperature is equal to or higher than 190° C.

11. The method of claim 1, wherein the heat temperature is equal to or lower than 410° C.

12. The method of claim 9, wherein the iron-based alloy is a zinc-plated steel sheet and wherein, prior to heat treating, further comprises:
  eutecticly fusing zinc of the zinc-plated steel sheet and aluminum of the aluminum-based alloy, thereby forming a fused material, the fused material having a low melting point;
  removing an oxide coating on a surface of the aluminum-based alloy at the bonding interface together with the fused material; and
  bonding by heating and cooling new surfaces of both dissimilar metals from which a zinc-plating layer and the oxide coating are removed.

13. The method of claim 12 wherein the heating occurs by electric resistance joining by energization heating.

14. The method of claim 5, wherein the intermetallic compound is formed in an area of 52% or greater of an area of the joining nugget.

15. The method of claim 14, wherein the intermetallic compound has a thickness of 0.5 to 3.2 µm.

16. The method of claim 15, wherein the electric resistance heating is performed using a spot-welding device.

* * * * *